Figure 1:
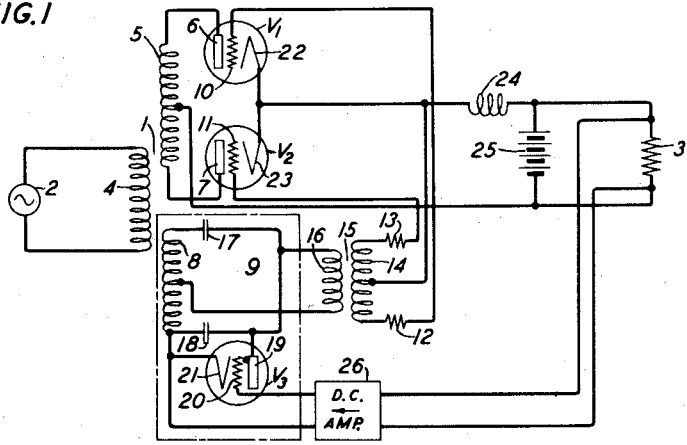

April 9, 1940.   L. E. MILARTA   2,196,680
REGULATED RECTIFIER CIRCUIT
Filed April 7, 1939   2 Sheets-Sheet 1

INVENTOR
L.E. MILARTA
BY
Wayne B Wells
ATTORNEY

April 9, 1940.   L. E. MILARTA   2,196,680
REGULATED RECTIFIER CIRCUIT
Filed April 7, 1939    2 Sheets-Sheet 2

INVENTOR
L. E. MILARTA
BY
Wayne B Wells
ATTORNEY

Patented Apr. 9, 1940

2,196,680

UNITED STATES PATENT OFFICE 2,196,680

REGULATED RECTIFIER CIRCUIT

Louis E. Milarta, Hollis, N. Y., assignor to Bell Telephone Laboratories, Incorporated, New York, N. Y., a corporation of New York Application April 7, 1939, Serial No. 266,515

8 Claims. (Cl. 175—363)

This invention relates to rectifier circuits and particularly to regulated rectifier circuits.

One object of the invention is to provide a regulated full wave rectifier circuit that shall maintain the rectified voltage constant in an improved manner without an unbalancing action and consequent overloading of the rectifier tubes.

Another object of the invention is to provide a rectifier circuit comprising two rectifier tubes controlled by a phase shift bridge that shall govern the phase shift bridge according to the rectified voltage by a single control tube in a manner to prevent unbalancing the loads on the two rectifier tubes.

A further object of the invention is to provide a full wave rectifier circuit comprising two rectifier tubes controlled by a phase shift bridge that shall govern the phase shift bridge according to the rectified voltage by a single control tube and that shall provide capacity in shunt to the control tube to equalize the loads on the two rectifier tubes.

A direct current load circuit may be supplied with rectified current from an alternating current supply circuit by means of gas-filled tubes. The gas-filled tubes which serve as rectifier elements may be of the three-element type having the potential impressed on the grids controlled to govern the rectified voltage. In one form of regulated rectifier circuits alternating potentials of the same frequency are impressed on the anodes and grids of the rectifier tubes and the phase relation between the potentials impressed on the anodes and grids is varied to control the rectified voltage. In a circuit of the above-indicated type the phase of the potential impressed on the grids with respect to the potential impressed on the anodes is varied to control the points in each cycle of the power current at which the rectifier tubes ignite and pass current. A so-called phase shift bridge may be employed to control the phase of the potential impressed on the grids with respect to the potential impressed on the anodes. The phase shift bridge may comprise two inductance arms in the form of a divided secondary winding of a transformer connected to the alternating current supply circuit, a capacity arm, and a resistance arm varied in accordance with the load circuit voltage. In a phase shift bridge constructed as above indicated the grid circuits of the rectifier tubes are connected between a mid-point on the divided secondary winding and a point on the bridge between the capacity arm and the variable resistance arm.

Heretofore it has very often been customary to make the variable resistance arm of the phase shift bridge in the form of a space discharge device and to control the device according to the rectified voltage. However, a space discharge device is conducting in only one direction and this means that the control tube in the phase shift bridge will have an impedance in the bridge varying according to the rectified voltage during one-half cycle of the power current for controlling one rectifier tube and will have an infinite impedance in the bridge for controlling the other rectifier tube. The above control by a single control tube results in unbalanced loads on the two rectifier tubes. One of the rectifier tubes will be overloaded, which reduces the service life of the overloaded tube and increases the maintenance cost. Unbalancing of the load on the two rectifier tubes also results in overheating of the transformer equipment and increased ripple in the rectifier output.

According to the present invention a regulated rectifier circuit comprising two gas-filled rectifier tubes of the grid-controlled type and a phase shift bridge having one arm in the form of a control tube is so controlled as to equalize the loads on the two rectifier tubes. The equalizing of the loads on the two rectifier tubes is effected by shunting the control tube with a condenser of such size that the two rectifier tubes ignite at points in each half cycle of the power current to have the same loads.

It is known that in a rectifier circuit controlled by a phase shift bridge with a variable resistance in one arm of the bridge, the rectifier tubes ignite early in each half cycle when the variable resistance in the bridge is small and ignite late in each half cycle when the variable resistance in the phase shift bridge is large. According to the above fact it is apparent a rectifier circuit having a phase shift bridge with a single control tube as the variable resistance element will have unbalanced loads on the two rectifier tubes. When the control tube is conducting for one half cycle of the power current the resistance of the control tube will be relatively small to ignite one rectifier tube early in one-half cycle. When the control tube is non-conducting for the other half cycle of the power current the resistance of the control tube will be relatively large to ignite the other rectifier tube late in the other half cycle.

In a regulated rectifier circuit constructed in accordance with the invention wherein a control condenser is shunted across the control tube in the phase shift bridge, it has been determined that the points in the half cycles of the power current at which the rectifier tubes ignite may be controlled by varying the size of the control condenser. During the half cycle when the control tube in the phase shift bridge is non-conducting the rectifier tube controlled at this time will ignite at the start of the half cycle if the control condenser is made equal to the condenser in the phase shift bridge. During the half cycle when the control tube is non-conducting the magnitude of the potential on the grid of the rectifier tube controlled at this time depends on the size of the control condenser and becomes smaller as the control condenser approaches the size of the condenser in the phase shift bridge. Thus by proper choice of the control condenser the point in the half cycle at which the rectifier tube ignites when the control tube is non-conducting may be governed.

During the half cycle of the power current when the control tube is conducting and is shunted by a control condenser the rectifier tube governed at this time has the ignition point controlled according to the size of the control condenser but at a smaller rate. Accordingly, it is possible to obtain an optimum size of the control condenser so as to effect ignition of the rectifier tubes at the same point in each half cycle of the power current.

In the accompanying drawings,

Fig. 1 is a diagrammatic view of a regulated rectifier circuit constructed in accordance with the invention.

Figure 2:
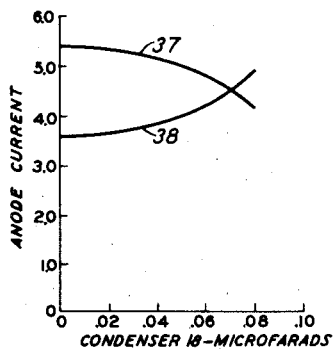

The curves in Fig. 2 of the drawings show the current flow through the rectifier tubes of Fig. 1 for compensating condensers of different sizes.

Figure 3:
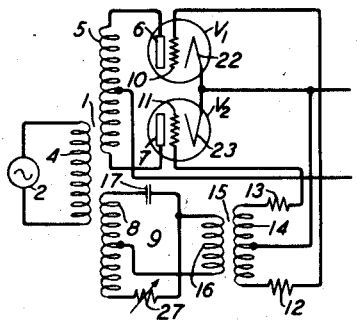

Fig. 3 of the drawings is a diagrammatic view of a regulator circuit of the type shown in Fig. 1 wherein the variable resistance in the phase shift bridge is the same for each half cycle of the power current.

Figure 4:
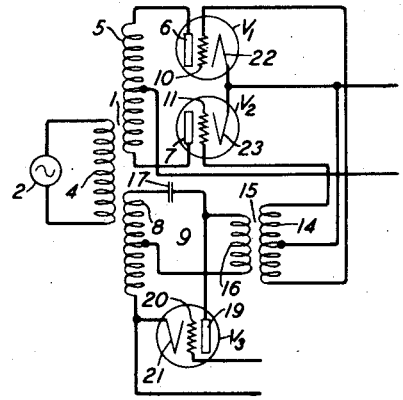

Fig. 4 of the drawings is a diagrammatic view of a regulator of the type shown in Fig. 1 wherein one arm of the phase shift bridge is formed by a single space discharge device.

Figure 5:
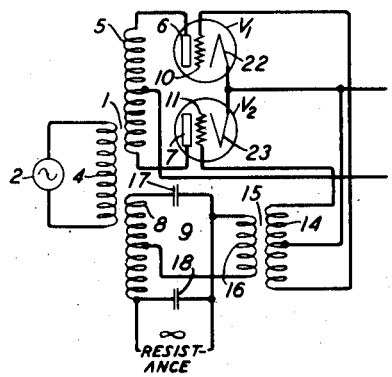
Figure 6:
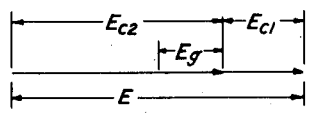
Figure 7:
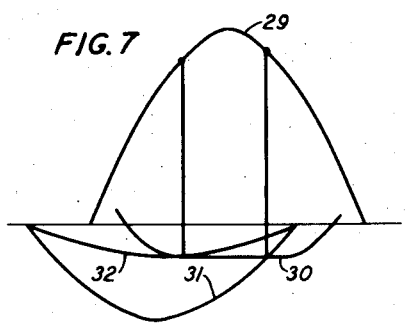

Figs. 5, 6 and 7 of the drawings are diagrammatic views illustrating the operation of the circuit shown in Fig. 1 on a steady-state basis during one half cycle of the power current.

Figure 8:
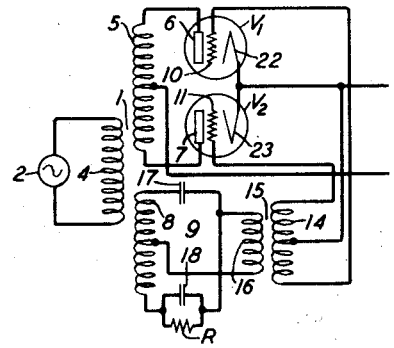
Figure 9:
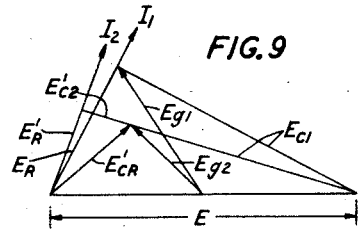
Figure 10:
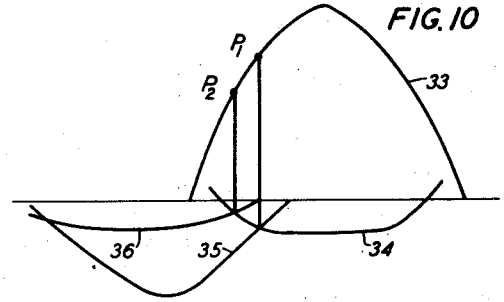

Figs. 8, 9 and 10 of the drawings are diagrammatic views illustrating the operation of the circuit shown in Fig. 1 on a steady-state basis during another half cycle of the power current.

Referring to Fig. 1 of the drawings, two rectifier tubes $V_1$ and $V_2$, which are preferably of the gas-filled type, are connected by a transformer 1 to a source of alternating current 2 for supplying full wave rectifying current to a load 3. The transformer 1 comprises a primary winding 4 which is connected to the source 2, a divided secondary winding 5 having the terminals thereof connected to the anodes 6 and 7 of the tubes $V_1$ and $V_2$ and a divided secondary winding 8 which forms two arms of a phase shift bridge 9. Two grids 10 and 11 of the rectifier tubes $V_1$ and $V_2$ are connected through resistance elements 12 and 13 to the secondary winding 14 of a transformer 15. The primary winding 16 of the transformer 15 is connected across two vertices of the phase shift bridge 9. The phase shift bridge 9 comprises two arms formed by the secondary winding 8 of the transformer 1, a capacity arm 17 and an arm formed by a regulator tube $V_3$ shunted by a compensating condenser 18. The regulator tube $V_3$ comprises an anode 19, a grid 20 and a cathode 21. The secondary winding 16 of the transformer 15 is connected between a mid-point of the secondary winding 8 and a vertex of the bridge 9 formed by the condenser 17 and the tube $V_3$ shunted by the condenser 18.

In the circuit formed, as above set forth, alternating potentials are impressed on the anodes and grids of the tubes $V_1$ and $V_2$ which have the same frequency. However, the potentials impressed on the grids 10 and 11 are varied in phase with respect to the potentials impressed on the anodes 6 and 7 to control the points in the half cycles of the power current at which rectifier tubes $V_1$ and $V_2$ ignite and pass current. The phase relation between potentials impressed on the anodes and grids of the tubes $V_1$ and $V_2$ is controlled by the phase shift bridge 9. The phase shift bridge 9 is governed according to the potential impressed on the grid 20 of the regulator tube $V_3$. The compensating condenser 18 which is shunted across the regulator tube $V_3$ serves to effect ignition of the tubes $V_1$ and $V_2$ in the different half cycles of the power current so that each tube has the same load thereupon.

The load circuit for the rectifier tubes $V_1$ and $V_2$ has one terminal connected to a mid-tap of the secondary winding 5 of transformer 1 and the other terminal connected to the cathodes 22 and 23 of the rectifier tubes $V_1$ and $V_2$. An inductance 24 is connected in series with the load circuit and a battery 25 is connected in parallel with the load 3. The potential impressed on the grid 20 of the regulator tube $V_3$ is controlled according to the rectified potential across the load circuit. A direct current amplifier 26 has the input circuit thereof connected across the load 3 and the output circuit thereof connected to the input circuit of the regulator tube $V_3$. The operation of this circuit will be described more in detail hereafter.

Referring to Fig. 3 of the drawings, a full wave rectifier circuit of the type shown in Fig. 1 is controlled by a pure resistance element 27 in the phase shift bridge in place of the regulator tube $V_3$ shown in Fig. 1. The parts in the circuit shown in Fig. 3 which are similar to parts of the circuit shown in Fig. 1 will be indicated by similar reference characters.

The phase relation between the potentials impressed on the grids and the plates of the tubes $V_1$ and $V_2$ shown in Fig. 3 of the drawings is controlled by manually varying the resistance arm 27 in the phase shift bridge 9. In a circuit, as shown in Fig. 3 of the drawings, it has been established experimentally that the rectifier output from the tubes $V_1$ and $V_2$ is a maximum when the resistance 27 is a minimum and is a minimum when the regulator resistance 27 is a maximum.

The circuit shown in Fig. 4 of the drawings is similar to the circuit shown in Fig. 3 of the drawings except that the resistance 27 shown in the phase shift bridge 9 of Fig. 3 is replaced by a regulator tube $V_3$. The regulator tube $V_3$ is unshunted by a compensating condenser as shown in Fig. 1 of the drawings. Like parts in the circuit shown in Fig. 4 of the drawings to those shown in the circuits of Figs. 1 and 3 will be indicated by similar reference characters.

In the circuit shown in Fig. 4 the impedance of the regulator tube $V_3$ will not be the same for each half cycle of the power current. This is the case because the tube $V_3$ will only be conducting in one direction, namely when positive potential is impressed on the anode 19 thereof. When the rectifier tube V2 has positive potential impressed on the anode 7 thereof the regulator tube V3 will have positive potential impressed on the anode 19 thereof so that the impedance of the tube V3 is controlled to control the ignition point of a rectifier tube V2. In the other half cycle of the power current the regulator tube V3 will have negative potential impressed on the anode 19 thereof so that it then has infinite impedance. Accordingly, it is apparent that the rectifier tube V1 is controlled at a time when the phase shift bridge 9 has infinite impedance in one arm thereof whereas the rectifier tube V2 is controlled when the arm of the phase shift bridge 9 has relatively small resistance or impedance therein. As pointed out when consideration was made of the circuit shown in Fig. 3 of the drawings, a small resistance in the control arm of the phase shift bridge 9 results in early ignition of a rectifier tube whereas a large resistance of the control phase shift bridge results in late ignition of a rectifier tube.

The two rectifier tubes V1 and V2 in Fig. 4 will be ignited at different points in the half cycles of the power current and the tubes will have different loads thereon. Thus one rectifier tube, namely the rectifier tube V2, will be overloaded.

The compensating condenser 18 in Fig. 1 of the drawings, which is connected across the regulator tube V3, serves to control the ignition points of the rectifier tubes V1 and V2 so as to equalize the loads on the two rectifier tubes.

Referring to Figs. 5, 6 and 7 of the drawings, an explanation will be given of the function performed by the compensating condenser 18 in controlling the rectifier tube V1 when the regulator tube V3 is non-conducting. Like parts in Fig. 5 of the drawings to those shown in Fig. 1 of the drawings are indicated by similar reference characters. In Fig. 5 of the drawings it is assumed that the condenser 18 is shunted by infinite impedance. An analysis of the action of the tube V3 becomes complicated because of the non-linearity and discontinuity in its resistance characteristics. Experimental data indicate, however, that a reasonable explanation can be constructed with the use of vector diagrams by considering the two half cycles separately and assuming that their effects are independent of each other. This method is satisfactory even though the effects of adjacent half cycles are not independent since the analysis is conducted on a qualitative, rather than a quantitative, basis.

In the vector diagram shown in Fig. 6 the vector E represents the voltage across the secondary winding 8 of the circuit shown in Fig. 5. The vector $E_{c2}$ represents the voltage across the compensating condenser 18. The vector $E_{c1}$ represents the voltage across the condenser 17 in the bridge 9. The vector $E_g$ represents the voltage impressed on the grid of the rectifier tube V1.

In Fig. 7 of the drawings the curve 29 represents the half cycle of the power current impressed on the plate of the rectifier tube V1 of the circuit shown in Fig. 5. The curve 30 represents the critical grid voltage for the rectifier tube V1. The curve 31 represents the grid voltage impressed on the grid 10 if no compensating condenser 18 is connected across the infinite impedance of the regulator tube V3. The curve 32 represents the grid voltage on the grid 10 of the rectifier tube V1 when the condenser 18 is shunted across infinite impedance of the control tube V3.

During the non-conducting half cycle for the regulator tube V3 it is evident that if the condenser 18 has a capacity equal to the capacity of the condenser 17 the voltage impressed on the grid 10 of the rectifier tube V1 will be zero and the rectifier tube V1 will ignite at the beginning of a half cycle of the power current. If the capacity of the condenser 18 is smaller than the capacity of the condenser 17 there will be no change in the phase of the voltage impressed on the grid 10 with respect to the potential on the anode 6. The value of the voltage impressed on the grid 10 depends on the capacity of the condenser 18 and becomes smaller as the capacity of the condenser 18 approaches the capacity of the condenser 17. By a proper choice of the capacity for condenser 18 the rectifier V1 may be made to ignite earlier in the half cycle of the power current to increase its anode current as shown in Fig. 7 of the drawings.

Referring to Figs. 8, 9 and 10 of the drawings, an explanation will be given of the function performed by the compensating condenser 18 in shunt to the regulator tube V3 as shown in Fig. 1 of the drawings when the regulator tube V3 is conducting. The circuit shown in Fig. 8 of the drawings is similar to the circuit shown in Fig. 1 of the drawings except that the tube V3 shown in Fig. 1 of the drawings has been replaced by a resistance marked R. Like parts in Fig. 8 of the drawings to those shown in Fig. 1 of the drawings will be indicated by similar reference characters.

In Fig. 9 of the drawings vector diagrams are shown for the circuit of Fig. 8 with and without the resistance arm shunted by the compensating condenser 18. The vector E represents the voltage across the secondary winding 8 of the transformer 1. The vector $E_{c1}$ represents the voltage across the condenser 17. The vector $E'_{cR}$, which represents the voltage across condenser 18 and resistance R in parallel, is obtained by first resolving the condenser 18 and the resistance R into an equivalent series arrangement. The vector $E'_{c2}$ represents the voltage drop across condenser 18 and the vector $E'_R$ represents the drop across the resistance R in the equivalent series arrangement of 18 and R. $E_{g1}$ represents the voltage impressed on the grid 11 of the rectifier tube V2 when the resistance R is not shunted by the compensating condenser 18. $E_{g2}$ represents the voltage impressed on the grid 11 of the rectifier tube V2 when the resistance R is shunted by the compensating condenser 18.

The triangle formed by the vectors $E_{c1}$, $E_R$ and E to obtain the grid voltage $E_{g1}$ is determined by the well-known circle diagram law. The vector $E_{g2}$ is obtained by first drawing the triangle with vectors $E'_R$ and $E'_{c2}$ to obtain the vector $E'_{cR}$. The circle diagram cannot be employed in obtaining the vector $E_{g2}$.

The curve 33 shown in Fig. 10 of the drawings represents the half cycle of the power current when positive potential is impressed on the plate 7 of the rectifier tube V2. The curve 34 represents the critical grid voltage for the tube V2. The curve 35 represents the potential impressed on the grid 11 of the tube V2 when the compensating condenser 18 is not shunted across the resistance R. The curve 36 represents the potential impressed on the grid 11 of the rectifier tube V2 when the condenser 18 is in shunt across the resistance R.

During the half cycle of the power current when the rectifier tube V₂ is conducting, the effect of the condenser 18, if equal in impedance to the resistance of R, is to decrease both the voltage on the grid 11 and the phase angle of lag between the grid voltage and plate voltage of the tube V₂. Decreasing the grid voltage and the phase angle tends to cause the rectifier tube V₂ to ignite earlier in the half cycle of the power current, thereby increasing the current flow through the rectifier tube V₂. However, the current flow through the power tube V₂ increases at a lower rate than the increase in current flow through the rectifier tube V₁ by reason of the addition of the compensating condenser 18. It is possible to obtain a value for the compensating condenser 18 such that the loads on the two rectifier tubes V₁ and V₂ are equal. If the resistance R is small compared to the reactance of the condenser 18 there is a negligible change in the voltage on the grid 11 and its phase angle so that as a result the current flow in the rectifier tube V₂ remains practically constant while the current flow in the rectifier tube V₁ increases with change in the compensating condenser 18.

When the control tube V₃ is automatically governed according to the load circuit voltage as shown in Fig. 1 of the drawings, the increase in current flow through the rectifier tube V₁ as a result of the action of the compensating condenser 18 causes an increase in the output voltage. This increase in the load voltage caused by the compensating condenser in turn effects an increase in the potential impressed on the grid 20 of the control tube V₃. Increasing the resistance of the control tube tends to reduce the current flow through both the rectifier tubes V₁ and V₂. However, since the increase in the capacity of the compensating condenser 18 causes the current in the rectifier tube V₁ to increase more rapidly than the current flow through the rectifier tube V₂ the combined effect is to cause the current flow through the tube V₂ to decrease and the current flow through the tube V₁ to increase with increase in the capacity of the compensating condenser 18. Referring to the curves shown in Fig. 2, the effect of changes in the capacity of condenser 18 is illustrated. The curve 37 indicates the current flow through the rectifier tube V₂ and the curve 38 indicates the current flow through the tube V₁ for different sizes of condensers 18. When the condenser 18 has a capacity of about .07 microfarad it is apparent that the current flows through the two rectifier tubes V₁ and V₂ are the same.

Modifications in the circuits and in the arrangement and location of parts may be made within the spirit and scope of the invention and such modifications are intended to be covered by appended claims.

What is claimed is:

1. In combination, three-element marginal rectifier tubes for supplying full wave rectified current from an alternating current supplying circuit to a load circuit, means comprising a phase shift bridge for controlling ignition of said rectifier tubes, a control tube in an arm of said bridge, means for governing said control tube according to the load circuit voltage to control said bridge and maintain the load circuit voltage constant, and means connected in shunt to said control tube for equalizing the load on said rectifier tubes.

2. In combination, three-element marginal rectifier tubes connected between an alternating current supply circuit and a direct current load circuit, a phase shift bridge for controlling the ignition of said rectifier tubes to effect full wave rectification, a control tube in an arm of said bridge, means for governing said control tube according to the load circuit voltage to control said bridge and maintain the load circuit voltage constant, and means comprising capacity added to the bridge arm including said control tube for equalizing the load on said rectifier tubes.

3. In combination, three-element marginal rectifier tubes connected between an alternating current supply circuit and a direct current load circuit, a phase shift bridge for controlling the ignition of said rectifier tubes to effect full wave rectification, said bridge comprising a capacity arm, two inductance arms in the form of a divided secondary winding of a transformer connected to said source, and an arm in the form of a control tube, means for governing said control tube according to the load circuit voltage to maintain the load circuit voltage constant, and means for adjusting said bridge to equalize the load on the rectifier tubes.

4. In combination, three-element marginal rectifier tubes connected between an alternating current supply circuit and a direct current load circuit, a phase shift bridge for controlling the ignition of said rectifier tubes to effect full wave rectification, said bridge comprising a capacity arm, two inductance arms in the form of a divided secondary winding of a transformer connected to said source, and an arm in the form of a control tube, means for governing said control tube according to the load circuit voltage to maintain the load circuit voltage constant, and means for adjusting the impedance of an arm of said bridge to equalize the load on the rectifier tubes.

5. In combination, an alternating current supply circuit, a direct current load circuit, two gas-filled space discharge devices having the plate circuits connected between said supply circuit and the load circuit to effect full wave rectification, control grids for controlling the ignition points of said devices, means comprising a phase shift bridge energized from said supply circuit for controlling the phase of the potential impressed on the grids with respect to the potential impressed on the plates of said devices, a three-element tube in one arm of said bridge, means for controlling said tube according to the load circuit voltage to maintain the load circuit voltage constant, and a condenser connected between the anode and cathode of said tube to equalize the load on said devices.

6. In combination, an alternating current supply circuit, a direct current load circuit, three-element gas-filled rectifier tubes between said circuits for effecting full wave rectification of the current from the supply circuit, a phase shift bridge energized by said alternating current source for impressing potential on the grids of said rectifier tubes and for controlling the phase relation between the potentials on the grids and anodes of said rectifier tubes, a three-element control tube in an arm of said bridge, means for impressing a potential on the grid of said control tube according to the load circuit voltage to control said bridge and maintain the load circuit voltage constant, and means comprising a condenser shunted across said control tube to equalize the load on said rectifier tubes.

7. In combination, three-element marginal rectifier tubes connected between an alternating current supply circuit and a direct current load circuit, a phase shift bridge for controlling the ignition of said rectifier tubes to effect full wave rectification, said bridge comprising a capacity arm, two inductance arms in the form of a divided secondary winding of a transformer connected to said source, and an arm in the form of a control tube, means for governing said control tube according to the load circuit voltage to maintain the load circuit voltage constant, and a capacity in shunt to said control tube for equalizing the load on the rectifier tubes.

8. In combination, two three-element marginal rectifier tubes for supplying full wave rectified current from an alternating current supply circuit to a load circuit, means comprising a phase shift bridge energized by said alternating current source for impressing potential on the grids of said rectifier tubes and for controlling the phase relation between the potentials on the grids and anodes of said rectifier tubes, said bridge including a control tube in one arm thereof, means for governing said control tube according to the load circuit voltage to maintain the load circuit voltage constant, and means for adjusting said bridge to control the phase of the potentials on the grids of the rectifier tubes to equalize the load on the rectifier tubes.

LOUIS E. MILARTA.